United States Patent
Liu (10) Patent No.: US 6,960,813 B2
(45) Date of Patent: *Nov. 1, 2005

(54) METHOD AND APPARATUS FOR CUTTING DEVICES FROM SUBSTRATES

(75) Inventor: Kuo-Ching Liu, Fremont, CA (US)

(73) Assignee: New Wave Research, Fremont, CA (US)

(*) Notice: Subject to any disclaimer, the term of this patent is extended or adjusted under 35 U.S.C. 154(b) by 2 days.

This patent is subject to a terminal disclaimer.

(21) Appl. No.: 10/664,755

(22) Filed: Sep. 17, 2003

(65) Prior Publication Data

US 2004/0029362 A1 Feb. 12, 2004

Related U.S. Application Data

(63) Continuation-in-part of application No. 10/384,439, filed on Mar. 6, 2003, which is a continuation of application No. 10/208,484, filed on Jul. 30, 2002, now Pat. No. 6,580,054, and a continuation-in-part of application No. 10/288,719, filed on Nov. 5, 2002, now Pat. No. 6,806,544.
(60) Provisional application No. 60/387,381, filed on Jun. 10, 2002.

(51) Int. Cl.[7] .................. H01L 27/14; H01L 29/82; H01L 29/84
(52) U.S. Cl. ............. 257/414; 257/440; 257/444
(58) Field of Search .............. 257/414, 428, 257/431, 432, 440, 444, 452

(56) References Cited

U.S. PATENT DOCUMENTS

| | | |
|---|---|---|
| 3,626,141 A | 12/1971 | Daly |
| 3,814,895 A | 6/1974 | Fredriksen |
| 3,816,700 A | 6/1974 | Weiner et al. |

(Continued)

FOREIGN PATENT DOCUMENTS

| | | |
|---|---|---|
| EP | 1137072 | 9/2001 |
| JP | 55151351 | 11/1980 |
| JP | 56006451 | 1/1981 |
| JP | 57066650 | 4/1982 |
| JP | 57081985 | 5/1982 |
| JP | 58044738 | 3/1983 |
| JP | 58044739 | 3/1983 |
| JP | 58068946 | 4/1983 |
| JP | 10064854 | 3/1998 |
| JP | 11224866 | 8/1999 |
| JP | 2000004066 | 1/2000 |
| JP | 2000196186 | 7/2000 |
| JP | 2001-170786 | 6/2001 |
| WO | WO 00/75983 | 12/2000 |

OTHER PUBLICATIONS

Chen, Hung–Lung et al., "Laser Successfully Cuts Sapphire Substrate," Optical Communication No. 93, Dec. 2001, pp. 37–40 (Chinese language document accompanied by English translation which consists of 9 pages.).

(Continued)

Primary Examiner—Phuc T. Dang
(74) Attorney, Agent, or Firm—Haynes Beffel & Wolfeld LLP (57) ABSTRACT

A method and system for cutting a wafer comprising a semiconductor substrate attached to an array of integrated devices includes placing the wafer on a stage such as a movable X-Y stage including a vacuum chuck having a porous mounting surface, and securing the wafer during and after cutting by vacuum pressure through the pores. The wafer is cut by directing UV pulses of laser energy at the substrate using a solid-state laser having controlled polarization. An adhesive membrane can be attached to the separated die to remove them from the mounting surface, or the die can otherwise be removed after cutting from the wafer.

35 Claims, 9 Drawing Sheets

U.S. PATENT DOCUMENTS

| | | | |
|---|---|---|---|
| 4,237,601 | A | 12/1980 | Woolhouse et al. |
| 4,336,439 | A | 6/1982 | Sasnett et al. |
| 4,543,464 | A | 9/1985 | Takeuchi |
| 4,562,333 | A | 12/1985 | Taub et al. |
| 4,664,739 | A | 5/1987 | Aurichio |
| 4,906,011 | A | 3/1990 | Hiyamizu et al. |
| 4,921,564 | A | 5/1990 | Moore |
| 5,057,664 | A | 10/1991 | Johnson et al. |
| RE33,947 | E | 6/1992 | Shinohara |
| 5,138,131 | A | 8/1992 | Nishikawa et al. |
| 5,324,012 | A | 6/1994 | Aoyama et al. |
| 5,387,776 | A | 2/1995 | Preiser |
| 5,611,946 | A | 3/1997 | Leong et al. |
| 5,626,777 | A | 5/1997 | Hugl et al. |
| 5,627,109 | A | 5/1997 | Sassa et al. |
| 5,703,713 | A | 12/1997 | Leong et al. |
| 5,801,356 | A | 9/1998 | Richman |
| 5,809,987 | A | 9/1998 | Wark et al. |
| 5,811,751 | A | 9/1998 | Leong et al. |
| 5,961,852 | A | 10/1999 | Rafla-Yuan et al. |
| 5,963,364 | A | 10/1999 | Leong et al. |
| 5,987,920 | A | 11/1999 | Bosman et al. |
| 5,994,205 | A | 11/1999 | Yamamoto et al. |
| 6,057,525 | A | 5/2000 | Chang et al. |
| 6,107,162 | A | 8/2000 | Morita et al. |
| 6,121,118 | A | 9/2000 | Jin et al. |
| 6,126,520 | A | 10/2000 | Jochim-Schmidt et al. |
| 6,130,401 | A | 10/2000 | Yoo et al. |
| 6,182,733 | B1 | 2/2001 | McReynolds |
| 6,365,429 | B1 | 4/2002 | Kneissl et al. |
| 6,413,839 | B1 | 7/2002 | Brown et al. |
| 6,509,546 | B1 | 1/2003 | Egitto et al. |
| 6,514,339 | B1 * | 2/2003 | Jung ............................ 117/107 |
| 2002/0031899 | A1 | 3/2002 | Manor |

OTHER PUBLICATIONS

Guoan, Wu et al., "Laser Processes and Microelectronic Technology," National Defense Industry Press, Beijing, China, Jul. 1997, 12 pages. (Chinese language document accompanied by English translation which consists of 12 pages.).

"Porous Tungsten & Molybdenum," available at http://www.spectramat.com/pormotun.html.

Soilmoisture Equipment Corp., Catalog, available at http://www.soilmoisture.com/ceramics.html.

SOILMOISTURE, "Porous Ceramics Catalog," available at http://www.soilmoisture.com.

Spectra–Physics Business Units: Products "Navigator II" (Oct. 7, 2002), 2 pages, see http://www.splasers.com/products/oem_products/fcb_yhb_series.html.

Spectra–Physics: Products "Navigator I" (Oct. 7, 2002), 2 pages, see http://www.splasers.com/products/oem_Products/navigator1.html.

Furukawa Electric, "What is UV–Tapes?" (May 23, 2002), 2 pages, see http://www.furukawa.co.jp/uvtape/en/whatis.htm.

Furukawa Electric product brochure, "UV–Tapes for Semiconductor Processing," 8 pages.

Ostendorf, A., et al., "Material Processing Applications for Diode Pumped Solid State Lasers," Lambda Highlights 57, Lambda Physik Pub. (May 2000), 8 pages.

Villeneuve, Tim, "Nanosecond pulsed lasers improve micro– machining," ESIGNNEWS Semiconductor Manufacturing (Jun. 04, 2001) 33–35.

* cited by examiner

Die Pattern on Wafer

METHOD AND APPARATUS FOR CUTTING DEVICES FROM SUBSTRATES

CROSS REFERENCE TO RELATED APPLICATION

The present application is a continuation-in-part of U.S. patent application Ser. No. 10/288,719, entitled METHOD AND APPARATUS FOR CUTTING DEVICES FROM CONDUCTIVE SUBSTRATES SECURED DURING CUTTING BY VACUUM PRESSURE, filed Nov. 5, 2002 now U.S. Pat. No. 6,806,544 which is incorporated by reference as if fully set forth herein; and The present application is also a continuation-in-part of co-pending U.S. patent application Ser. No. 10/384,439, entitled SCRIBING SAPPHIRE SUBSTRATES WITH A SOLID STATE UV LASER, filed Mar. 6, 2003; which is a continuation of U.S. patent application Ser. No. 10/208,484, filed Jul. 30, 2002, now U.S. Pat. No. 6,580,054 which is incorporated by reference as if fully set forth herein; which claims the benefit of U.S. Provisional Application No. 60/387,381, filed Jun. 10, 2002.

BACKGROUND OF THE INVENTION

1. Field of the Invention

The present invention relates to systems and processes used in manufacturing integrated device die, such as integrated circuits and laser diodes, including diode lasers formed on substrates. More particularly, the present invention provides for securing wafers having substrates, during the process of cutting the wafers into individual die, and further provides for securing the die separated from the wafers during and after the wafer cutting process.

2. Description of Related Art

Sapphire $Al_2O_3$ is used as a substrate for the growth of Gallium Nitride GaN in commercial laser diode manufacturing systems, and can also act as the substrate of the finished product. However, the use of sapphire substrates introduces certain problems.

For instance, sapphire is an electrical insulator and this causes problems when it is used as a wafer substrate in the fabrication of laser diodes. Because it is an insulator, electrical contacts to the diodes are usually placed on the wafer's active surface, and these contacts occupy areas that would otherwise be utilized for generation and emission of light.

Efforts have been made to implement laser diodes using GaN with other substrates. These approaches typically involve removal of the GaN from the sapphire substrate on which it is grown, and then remounting it on another substrate. Advantages of this approach arise because copper or other metal substrates are excellent heat and electric conduction materials. A light emitting diode or laser diode LED with a metal substrate can be driven with higher current and yield brighter output. In addition, the device with good electric conduction to the substrate requires only one wire bonding on the active surface, and yields higher output. Furthermore, the sapphire substrate used for growth of the GaN may be reused for reduced cost.

For example, U.S. Pat. No. 6,365,429 teaches a method by which "removal of the sapphire substrate after growth of the laser diode array structures simplifies providing electrical contacts to the laser diode arrays and avoids special architectures while allowing a superior heat sink to be attached to the laser diode arrays. The laser diode array may be attached to a thermally conductive wafer before or after substrate removal by soldering, thermo-compression bonding or other means." (col. 2 ll. 20–28)

However, no known method or tools to dice this type of wafer have been applied on a commercial scale.

Present methods of separating a wafer based on a sapphire or crystalline semiconductor substrate into die involve scribing the wafer after first adhering the wafer to a flexible sheet, known as "blue tape". After scribing, mechanical pressure is applied to break the wafer along the scribe lines, leaving the die attached to the flexible sheet for their subsequent removal.

However, wafers having metal substrates cannot be separated into die using scribing techniques. Rather, wafers having a metallic substrate, for example one made of copper, must be cut completely through to obtain separated die. Cutting completely through the wafer would damage an adhesive sheet attached to the wafer, unless very precise control of the cutting process were possible. Furthermore, if an adhesive sheet is not attached to the wafer prior to cutting the die, in order to avoid the damage, the separated die would be difficult to handle during and after the cutting of the wafer. Thus, there is a need for a method and system for securing both the wafer and the separated die during and after the cutting of the wafer.

It is desirable, therefore, to provide a system and method for dicing wafers having semiconductive, conductive or metallic substrates, for use in fabricating die in large volume, in an efficient manner that maximizes the die-manufacturing yield. Furthermore, it is desirable that such a system be compact, safe to operate, and low cost.

SUMMARY OF THE INVENTION

Therefore, it is an object of the present invention to provide for securing a substrate to a mounting surface in order to perform the cutting substantially through the substrate, thereby permitting separation of the substrate into die in accordance with a cutting pattern. It is a further object of the present invention to provide for securing the separated die to the mounting surface, both during and after the cutting process.

One embodiment of the invention provides a method for dicing a wafer, comprising mounting the wafer on a porous member having a mounting surface; securing the wafer on the mounting surface by applying suction to the wafer through pores in the porous member; and dicing the wafer into individual die, the die remaining secured to the mounting surface by the applied suction.

The present invention provides a method comprising mounting a wafer having substrate, and carrying an array of integrated devices, on a stage such as a movable X-Y stage further comprising a vacuum chuck provided with a porous mounting surface. Applying suction through the pores of the mounting surface secures the wafer to the mounting surface. The wafer is cut in one embodiment by directing laser energy at a surface of the wafer using a solid-state laser, to form a plurality of kerfs substantially through the thickness of the wafer, thereby dicing the wafer. Cutting a wafer by the present method cuts kerfs through the wafer, the kerfs having a width preferably in the range of 10 to 20 microns.

The present invention is suitable for manufacturing blue laser diodes based on Gallium Nitride structures that have been removed from the substrate on which they were grown, and then mounted on a substrate. Substrates include herein metals, semiconductors and other compounds or materials that are relatively conductive, especially as compared to sapphire, and provide at least one of superior temperature and electrical conductivity. The present invention can also be applied to non-substrates, including sapphire. According to the present invention, greater device density on the wafer, and greater manufacturing yield are achieved, while also reducing the time required for dicing the wafer into individual die. Furthermore, the present invention is based on compact, low-cost machines, and otherwise reduces the overall manufacturing costs for such integrated device die.

In accordance with the present invention, the X-Y stage comprises a vacuum chuck provided with a thin porous mounting surface. The porous mounting surface in various embodiments comprises a thin paper, plastic, ceramic or metal disk having dense micro pores through which a negative pressure can be applied to a wafer placed in direct contact with the mounting surface. Embodiments of the porous member comprise one or more of porous paper, gas filters, sintered ceramic disks or plates, and sintered metal disks and plates made of various compositions.

Also in accordance with embodiments of the present invention, the mounting surface comprises a removable member. The use of a removable member further permits the ready replacement of the mounting surface when required due to wear or contamination.

The laser energy utilized in some embodiments to cut kerfs in the wafer should have a wavelength highly absorbed in the material of the substrate. Further, the wavelength should be selected so that it is absorbed to a much greater degree in the substrate than in the porous member, so that when the substrate is cut through and the laser impacts the porous member, minimal damage is caused to the porous member. For copper and similar metal substrates, the wavelength is preferably below about 560 nanometers, and more preferably between about 150 in 560 nanometers. In addition, energy density, spot size, and pulse duration are established at levels sufficient to cut kerfs completely through the wafer. Control of the system, such as by moving the stage while maintaining a stationary beam path for the pulses, causes the pulses to contact the substrate in a cutting pattern at a rate of motion causing overlap of successive pulses sufficient to cut through the substrate and other portions of the wafer.

Embodiments of the present invention utilize laser pulses having an energy density between about 10 and 100 joules per square centimeter, a pulse duration between about 10 and 30 nanoseconds, and a spot size between about 5 and 25 microns. The repetition rate for the pulses is greater than 5 kHz, and preferably ranges from about 10 kHz to 50 kHz or higher. The stage is moved at a rate of motion causing overlap of the pulses in the amount of 50 to 99 percent. By controlling the pulse rate, the rate of motion of the stage, and the energy density, the depth of the cut can be precisely controlled, to provide for cutting through the wafer while minimizing the amount of laser energy reaching the mounting surface securing the wafer.

In embodiments of the present invention, the solid-state laser comprises a diode pumped, Q-switched, Nd:YVO$_4$ laser, including harmonic frequency generators such as nonlinear crystals like LBO, so that output of the laser is provided at one of the second, third, fourth and fifth harmonic frequencies of the 1064 nanometer line produced by the neodymium doped, solid-state laser. In particular systems, the third harmonic frequency of about 355 nanometers is provided. In other embodiments, the solid-state laser comprises a Q-switched, Nd:YAG laser, operating to provide one of the harmonic frequencies as output.

In embodiments of the invention, the method includes detecting edges of the substrate while directing pulses at the substrate in the cutting pattern. In response to detected edges, the system prevents the pulses of radiation from being directed beyond the substrate.

Embodiments of the present invention direct the pulses of laser radiation at the backside of the wafer substrate.

Thus, embodiments of the invention include mounting the wafer on the stage, moving the wafer under conditions causing cutting of the substrate in a cutting pattern on the backside of the substrate, and detecting edges of the substrate during the cutting process to prevent the pulses of laser radiation from impacting the mounting surface.

The die defined by a cutting pattern are separated from the wafer by the laser energy, while the suction applied through the pores of the mounting surface continues to secure them substantially in the same location they occupied on the mounting surface prior to the cutting. In one embodiment, an adhesive tape is placed onto the separated die after dicing the wafer is completed, in order to permit removal of the die as a set, and facilitate their handling for subsequent manufacturing steps. Furthermore, the die separated from the wafer remain adhered to the adhesive tape until removed using a pick and place robot, or other technology.

Certain embodiments of the invention further provide for controlling polarization of the laser pulses with respect to direction of the kerfs in the cutting pattern. The polarization is controlled so that kerfs are more uniform for kerfs cut parallel to different axes. Uniformity can be improved by random or circular polarization of the pulses in some embodiments. More preferably, polarization of the pulses is controlled so that the polarization is linear and parallel to the kerfs being cut. Embodiments of the invention provide for control of the polarization using a laser with an adjustable polarizer, such as a half wave plate, in the optical path.

The invention also provides a system for cutting wafers having a substrate which comprises a solid-state laser, as described above, a stage having a vacuum chuck with a porous surface adapted to support and move a substrate, optics directing pulses to impact of substrate mounted on the stage, an edge detection system which detects edges of substrate mounted on the stage during movement of the stage, and a control system. The control system in embodiments of the invention comprises a computer system coupled to the solid-state laser, the stage, and the edge detection system. The computer is responsive to the edge detection system and parameters set by users to cause the pulses to impact of the substrate in a cutting pattern at a rate of motion causing overlap of successive pulses sufficient to cut kerfs in the substrate. Embodiments of the invention also include a debris exhaust system coupled with the stage.

Embodiments of the invention include a user interface with logic to set up the cutting pattern, and the operational parameters including pulse repetition rate, stage velocity and energy levels to establish kerf depth, cutting speed and other characteristics of the process.

Other aspects and advantages of the present invention can be seen on review of the drawings, the detailed description, and the claims which follow.

DETAILED DESCRIPTION

A detailed description of embodiments of the present invention is provided with reference to FIGS. 1 through 12A–12C.

Figure 1:
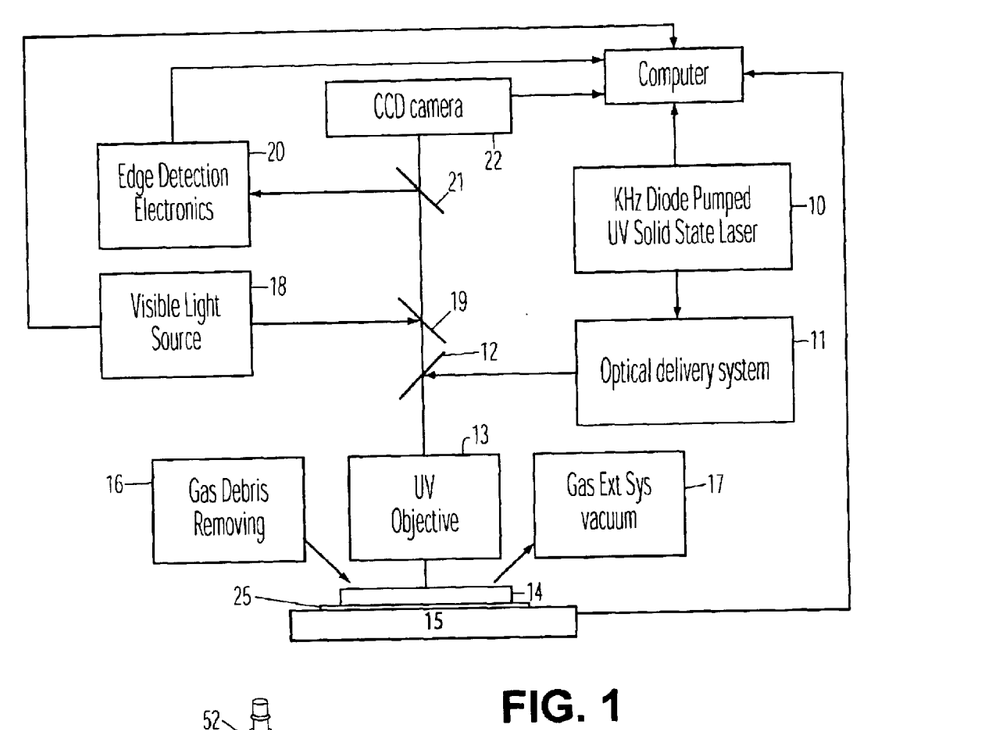
FIG. 1 is a simplified block diagram of a wafer cutting system according to the present invention.

FIG. 1 is a simplified block diagram of a wafer cutting system according to the present invention. In the embodiment shown, wafer 14, including a substrate and an active layer, is mounted with its active surface facing downward on movable X-Y stage 15. The stage 15 includes a porous member 25 on which the wafer is secured by suction through pores on the surface of the porous member. High-intensity UV laser energy is directed at the substrate surface of the wafer through UV objective 13. A diode pumped, solid-state laser 10 generates the high-intensity UV and close-to-UV pulses at a repetition rate in the kHz range. In preferred systems, the laser comprises a Q-switched Nd:YVO$_4$ medium delivering third harmonic output as the stream of laser pulses at a repetition rate greater than 10 kHz, with a pulse duration of about 40 nanoseconds. The pulses are provided using an optical delivery system 11 and turning mirror 12 to an ultraviolet objective lens 13, which focuses the pulses on wafer 14.

The wafer 14 is supported on a vacuum chuck on X-Y stage 15. In the embodiment shown, the wafer is supported with its active surface down on a porous member 25 having a mounting surface. A vacuum system applies suction to wafer 14 through the pores of the mounting surface, thereby securely holding the wafer to the vacuum chuck while the X-Y stage is moved beneath the UV objective, to cut the wafer using laser energy, in accordance with the cutting pattern. A gas debris removing system 16 cooperates with a gas exhaust system and vacuum 17 to remove debris generated by the ablation of the substrate and wafer materials.

Figure 2:
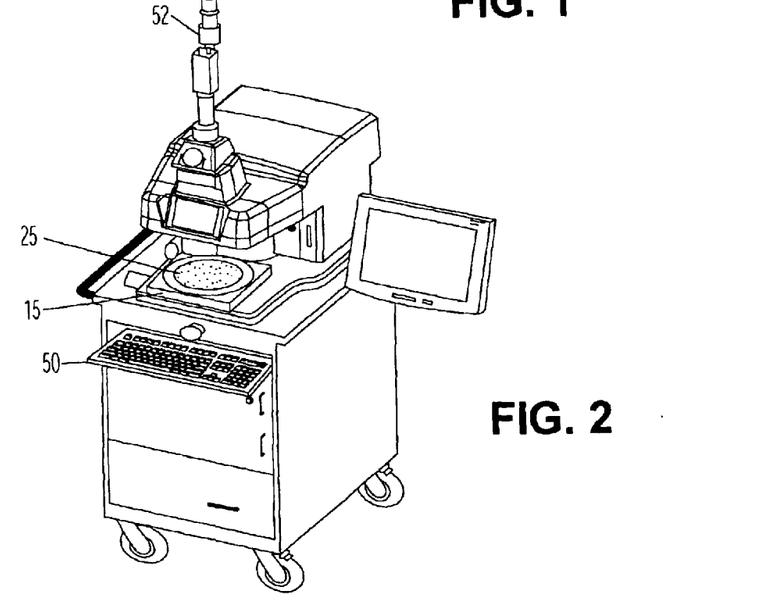
FIG. 2 is a perspective view of a compact, portable wafer cutting system according to one embodiment of the present invention.

FIG. 2 is a perspective view of a wafer cutting system in one embodiment of the invention. The X-Y stage 15 and porous member 25 are located beneath microscope 52. The diode pumped solid-state laser is compact and low-cost so that it is efficiently mounted on a cart as illustrated. The computer and other system electronics are contained on the cart. The computer keyboard 50 is mounted on a keyboard tray, which slides in and out of the cart. A flat-panel display 51 is mounted on a swivel base, so that it may be folded in during movement and storage of the cart. The system includes a microscope 52, which enables viewing of the wafer during the cutting process. Microscope 52 also serves to deliver the laser energy used in cutting the wafer. Images generated by the camera 22, and graphical user interface tools and other display constructs are presented to the user using the display 51.

The X/Y stage includes a vacuum chuck having a porous member providing a mounting surface at least 2.5 inches in diameter, on a six-inch platform, for holding a two-inch wafer during alignment and cutting. The porous member is removable in some embodiments of the invention. Representative vacuum chucks that are adaptable for use in the present invention are described in U.S. Pat. No. 4,906,011, entitled VACUUM CHUCK.

In one embodiment, the wafer holding surface of the porous member is made of sintered ceramic materials. For representative examples of these sintered ceramic mounting members, the wafer mounting or holding surface has pore sizes in a range between 0.15 um and 10 um, with a porosity range between 25% and 75% by volume.

In other embodiments of the present invention, the wafer holding surface of the porous member is made of sintered metallic materials. For representative examples of these sintered metallic mounting members, the wafer mounting or holding surface has pore sizes in a range between 1 um and 20 um, with a porosity range between 10% and 60% by volume.

In yet other embodiments of the present invention, the wafer holding surface of the porous member is made of flexible porous materials, such as paper or plastic. For these flexible porous mounting members, the pore distribution varies in accordance with the type of porous material utilized. In some embodiments of the invention, the porous member is disposable and can be removed and replaced between wafers during the cutting process, at low cost. In one example embodiment, the porous member comprises a leaf of commercially available lens paper, typically used for cleaning optical lenses.

Generally, embodiments of the present invention are provided as a semiautomatic turnkey system using a tabletop laser system and computer mounted on a cart. The system provides for manual loading and unloading of wafers. However, the invention contemplates automated wafer loading and unloading systems as well. Representative systems are adapted to receive two inch substrate wafers with die sizes, for example about of 250 to 300 square. Smaller and larger die sizes are readily handled. The wafer thickness ranges from about 80 to 200 microns, for typical laser diode die. The wafer is manually placed on the stage and secured using the suction of the vacuum chuck. Manual alignment of the wafer is possible using manual stage controls. Software controlled cutting patterns are implemented with computer control of the wafer stage, and controllable speed in the X- and Y-directions. The system includes a class one laser system which generates spot sizes less than 20 microns in operational conditions. A kerf is cut to a depth close to the thickness of the wafer, and more preferably equal to the thickness of the wafer. Nitrogen gas is used by the debris removing jet, and evacuated using an exhaust pump. Minimal or no damage is caused to the mounting surface because the wavelength of the laser is selected so that it is not significantly absorbed by the porous member, and because of the edge detection process, supporting greater yield in the wafer cutting process.

The laser system in a preferred embodiment is an electro-optically Q-switched, diode pumped, third harmonic Nd:YVO$_4$ providing an output at 355 nanometers wavelength. The pulses have a TEM$_{00}$ intensity profile with 10 to 15 micron, or smaller, diameter at 1/e$^2$ peak magnitude spot size on the target surface. The laser pulse duration is about 40 nanoseconds, or less and more preferably between about 30 and 10 nanoseconds, for example about 16 nanoseconds.

The basic structure of the laser system is like the commercially available Acculase SS10 Laser System, by New Wave Research, of Fremont, Calif., which is the assignee of the present invention.

The computer system allows for automated control of the laser and stage movement for defined cutting patterns, which can be set up using the computer. A wafer map and cutting definition function allows setup of the cutting pattern including rotation control of the stage. Video overlay shows live video of the sample within a software-controlled window to facilitate set up and monitoring of the process. Control for the cutting parameters including laser energy, repetition rate and stage speed are provided via the user interface, giving the operator precise control over the depth and quality of the scribing process. A pattern alignment function allows the cutting pattern to be moved in the X-, Y- and orthogonal directions to match the actual wafer location during setup.

Figure 3:
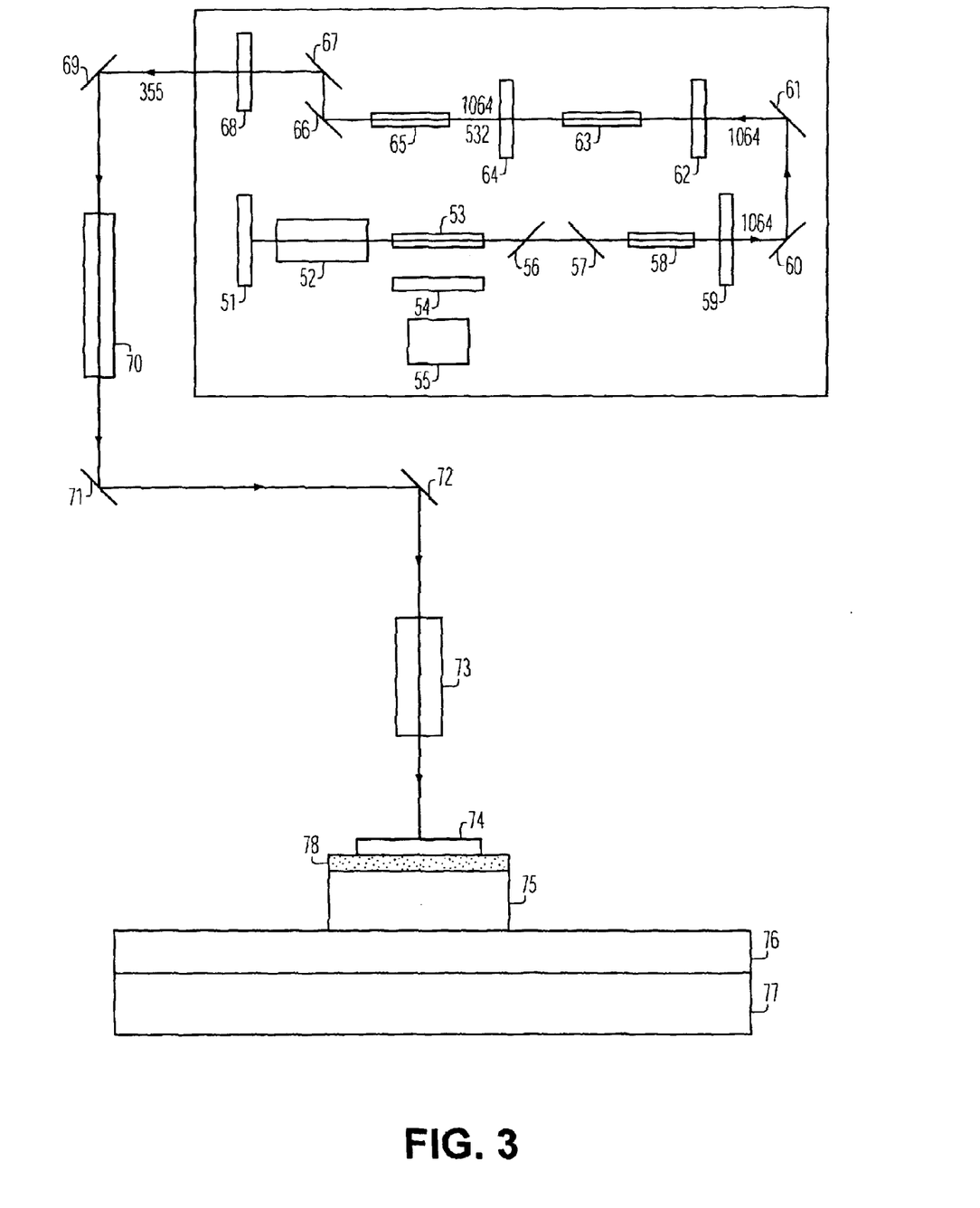
FIG. 3 is a simplified block diagram including the laser system and optics for the wafer cutting system of the present invention.

FIG. 3 is a basic layout of optical path for one embodiment of the cutting system according to the present invention. The optical path includes a laser 50, optics delivering the output of the laser to a substrate 74 mounted on the mounting surface of porous member 78 on the vacuum chuck 75 mounted on an X-stage 76 and Y-stage 77. The porous member 78 in this embodiment is attached to the vacuum chuck 75. In other embodiments, the porous member 78 is secured to the vacuum chuck by suction during operation.

The laser includes a resonant cavity defined by high reflector 51 and output coupler 59. A beam expander 52, laser medium rod 53, cylindrical lens 56, diode array 55, thin film polarizer 56, thin film polarizer 57, and electro-optic Q-switch 58 are included. The diode array is operated to pump the rod 53 to induce resonance at the 1064 nm line for Nd:YVO$_4$. The output beam is directed to turning mirror 60 and turning mirror 61 through spherical focal lens 62 through nonlinear crystal 63. The nonlinear crystal 63 produces a second harmonic and passes the second harmonic along with the primary line through spherical focal lens 64 to a second nonlinear crystal 65. The second nonlinear crystal produces a third harmonic output, among others, which is delivered to turning mirror/filter 66 and turning mirror/filter 67 and half lambda wave plate 68. The wave plate 68 is motorized and acts as a controllable polarizer for the output beam. The wave plate 68 may be used to align the polarization of the output beam with respect to the cutting direction to make a kerfs cut by the laser pulses uniform in the X- and Y-directions. The third harmonic output, at a wavelength of about 355 nanometers, is delivered to optics including turning mirror 69, beam expander 70, turning mirror 71, turning mirror 72 and objective 73 to the substrate 74. The objective lens 73 is a 20× lens in this embodiment.

The nonlinear crystal 63 used for second harmonic generation can be made of a variety of materials, preferably LBO, BBO or KTP. Likewise, the nonlinear crystal 65 used for third or higher harmonic generation can be made of a plurality of materials, preferably LBO or BBO. In one preferred system, LBO is utilized for both nonlinear crystals 63 and 65.

Figure 4:
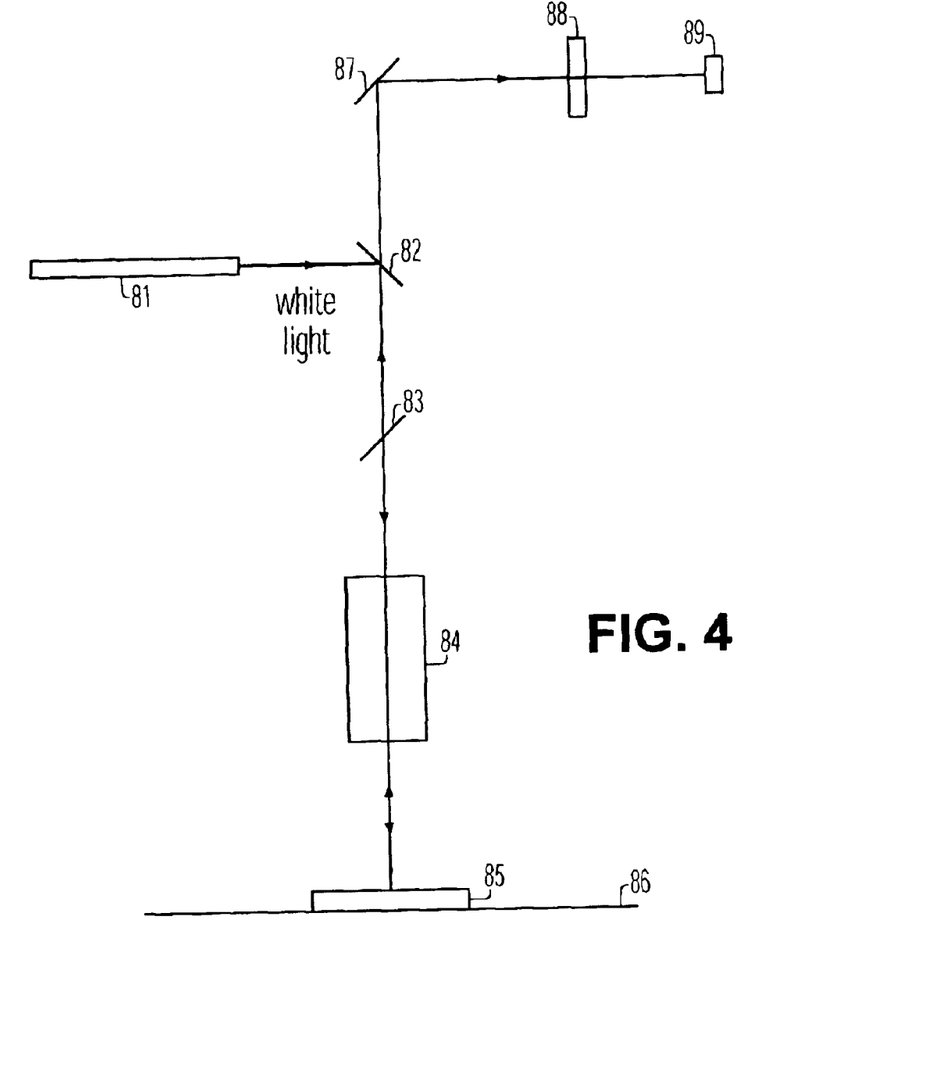
FIG. 4 is a simplified block diagram of the edge detection according to one embodiment of the present invention.

FIG. 4 illustrates the edge detection system used in preferred embodiments of the present invention. The system includes a white light source 81 which provides light through turning mirror 82 and objective lens 84 to the substrate 85 on the porous surface 86 of a mounting medium. Reflected light passes through objective lens 84, turning mirror 83, turning mirror 82 and is deflected by turning mirror 87 through a spherical focal lens 88 to a photodetector 89. The photodetector 89 is coupled with the computer system, and its output indicates edge detection. The edge of the wafer is detected based on the significant difference of light contrast between the wafer surface 85 and the holding surface on which the wafer is mounted. The computer system stops the motion of the stage upon receipt of the edge detection signal, preventing laser pulses from being directed beyond the surface of the wafer.

Figure 5:
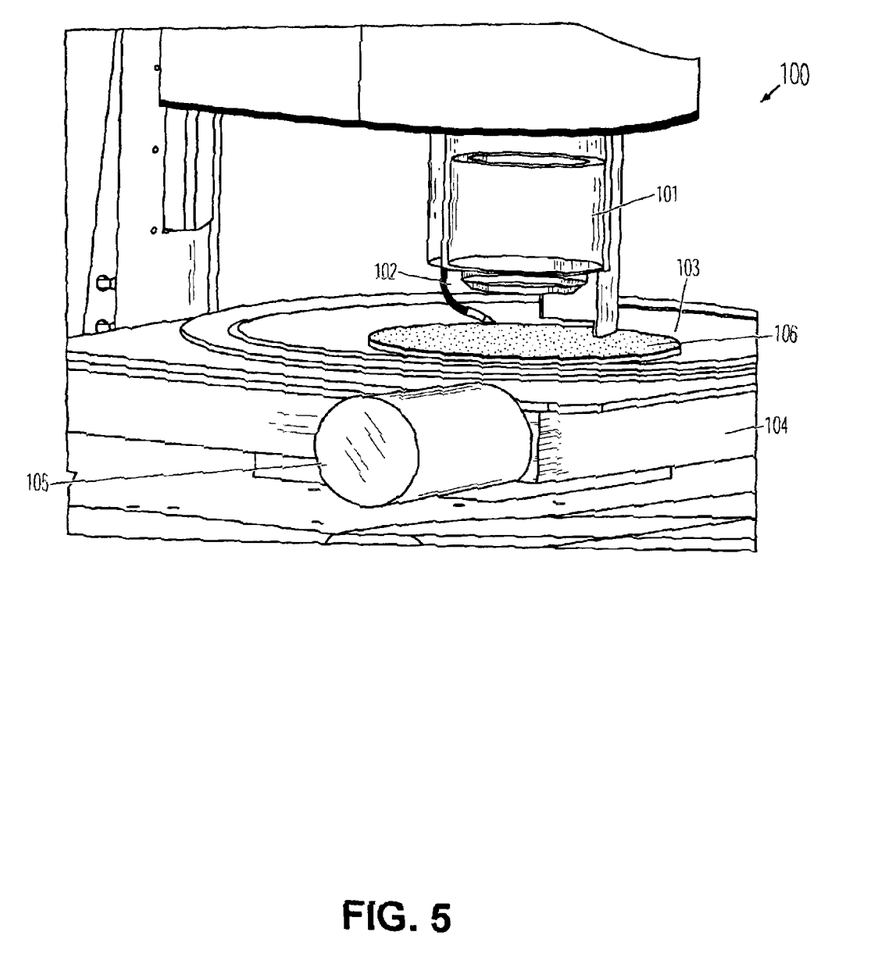
FIG. 5 is a perspective view of the X-Y stage comprising a vacuum chuck having a porous mounting surface, and a debris exhaust system, of the wafer cutting system according to one embodiment of the present invention.

FIG. 5 provides a perspective of the stage 100, objective lens 101 and debris removal jet 102 in one embodiment of the invention. The stage 100 includes a vacuum chuck 103 centered on a movable plate 104. The vacuum chuck further comprises porous member 106, having a mounting surface for holding the wafer. A movable plate 104 includes manual adjustment knob 105 for the Y-direction and a similar adjustment knob (not shown) for the X-direction. Also, the movement of the stage is automatically controllable. The jet 102 is arranged to deliver air or nitrogen gas into the region of the ablation in order to remove debris. A vacuum (not shown) withdraws the gas with the debris from the region of the wafer.

In a representative system, the repetition rate is controllable within a range of 20 to 50 kHz, with a stage speed ranging up to 8 to 10 mm per second. Other combinations of repetition rate and stage speed will be developed according to the needs of a particular implementation.

Figure 6:
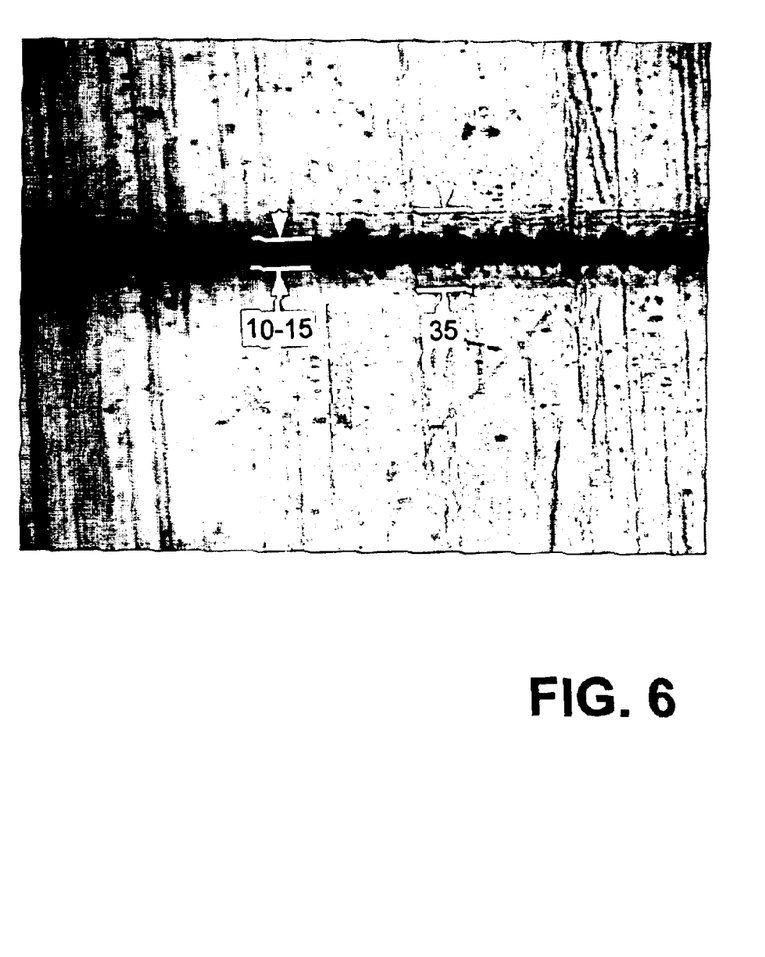
FIG. 6 is an image of a kerf on a substrate including an array of integrated laser diodes according to the present invention.

FIG. 6 shows a magnified view of a wafer having an array of laser diodes formed thereon. Spaces, or streets, about 35 microns wide are left between the individual laser diodes to allow room for cutting. In FIG. 6, kerfs (dark lines within the streets) are machined having a width of 10–15 microns, on the top surface for perspective of the relative widths. In a preferred system, kerfs are cut through from the backside of the wafer. With the system of the present invention with a spot size in the range of 10 microns, and the precision available, the streets can be reduced to 20 or 30 microns in width or less. This significantly increases the density of devices that can be made on a single substrate and improves throughput in manufacturing process for the die.

Figure 7:
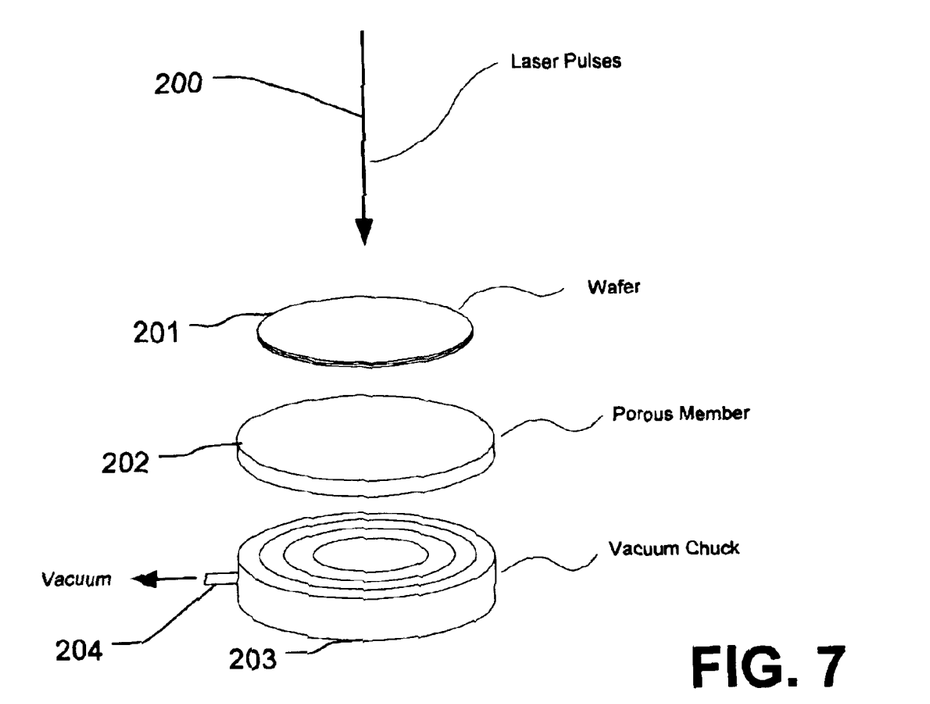
FIG. 7 is a perspective view of a wafer, the porous member, and the vacuum chuck employed in the wafer cutting system of the present invention.

FIG. 7 illustrates the basic process of the present convention. In particular, a porous member 202 is secured to a vacuum chuck 203. The vacuum chuck is coupled via coupling 204 to a source of vacuum suction. The porous member 202 may be secured to the vacuum chuck 203 by the suction of the vacuum, or may be more securely attached depending on the needs of the particular implementation. A wafer 201 is placed on the porous member 202, and secured on the porous member by suction through the pores in the surface of the porous member during the cutting operation. Laser pulses 200 are directed at the wafer 201 for the purposes of cutting kerfs through the wafer. The wafer 201 comprises a layer of GaN 5 to 10 microns thick and a metal substrate such as copper about 100 microns thick.

Figure 8:
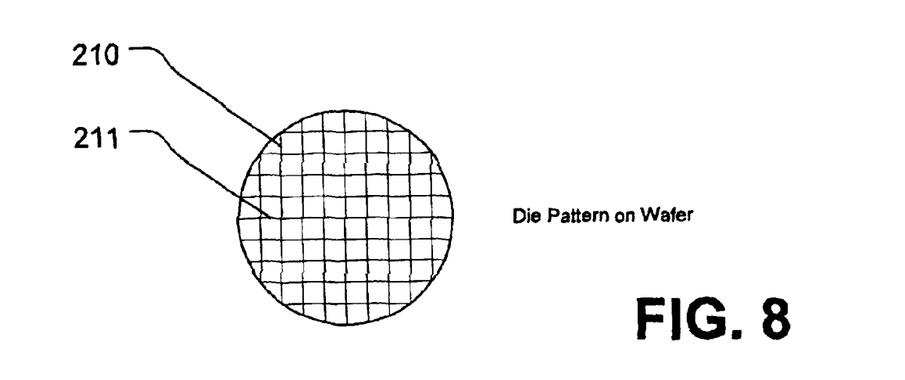
FIG. 8 is a top view of a wafer showing a representative cutting pattern.

FIG. 8 illustrates a cutting pattern for the kerfs. As can be seen, horizontal kerfs 211 and vertical kerfs 210 are cut in the wafer to separate individual elements from the wafer. For a typical GaN laser diode, the elements are rectangles or squares about 250 to 300 microns on a side. Each individual element will include one or more laser diodes in the various embodiment of the invention. Shapes other than square or rectangular may be made as well.

Figure 9:
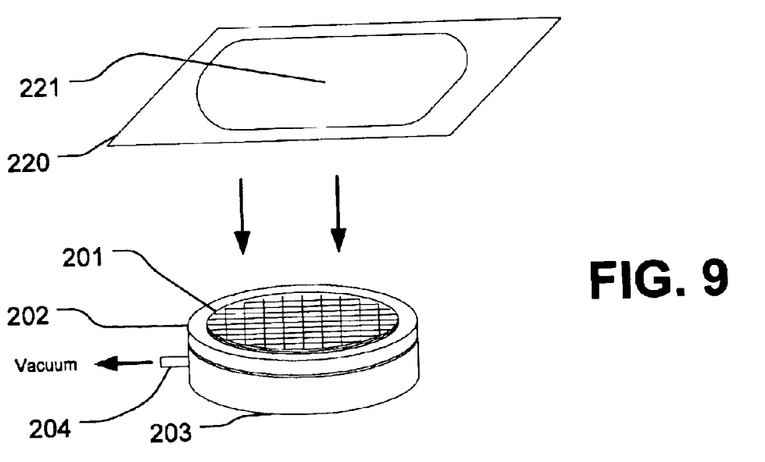
FIG. 9 illustrates a process of applying adhesive flexible tape to the cut wafer, in accordance with one embodiment of the present invention.

As shown in FIG. 9, the wafer 201 has been secured on the porous member 202 by suction supplied by the vacuum chuck 203 and the source of vacuum 204. Laser pulses have been applied to cut the wafer 201 into an array of individual elements. A flexible adhesive tape 221, known as "blue tape" in the semiconductor manufacturing industry, is applied to a frame 220. The frame 220 with the tape 221 is lowered onto the array of elements which had been cut from the wafer 201. The array of elements adheres to the adhesive tape 221, the vacuum is reduced or removed, and the adhesive tape 221, attached to the frame 220 with the array of elements adhered thereto, are removed from the workstation.

Figure 10:
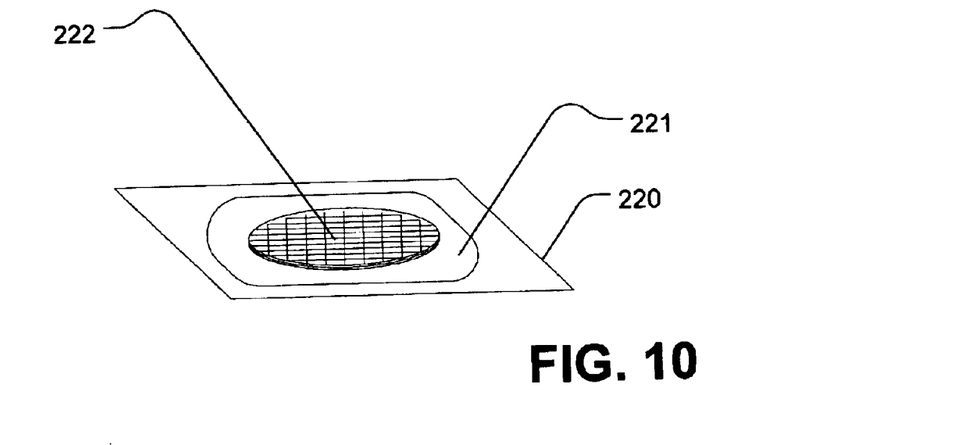
FIG. 10 illustrates the array of elements adhered to the adhesive tape after removal from the stage of the cutting system.

FIG. 10 illustrates a resulting workpiece including the frame 220, with the flexible tape 221 having an array of individual elements, such as element 222, adhered thereto. The workpiece of FIG. 10 is then supplied to a pick and place robot system, where the adhesive tape is stretched to separate the individual elements, and robot may remove the elements for further processing.

Figure 11:
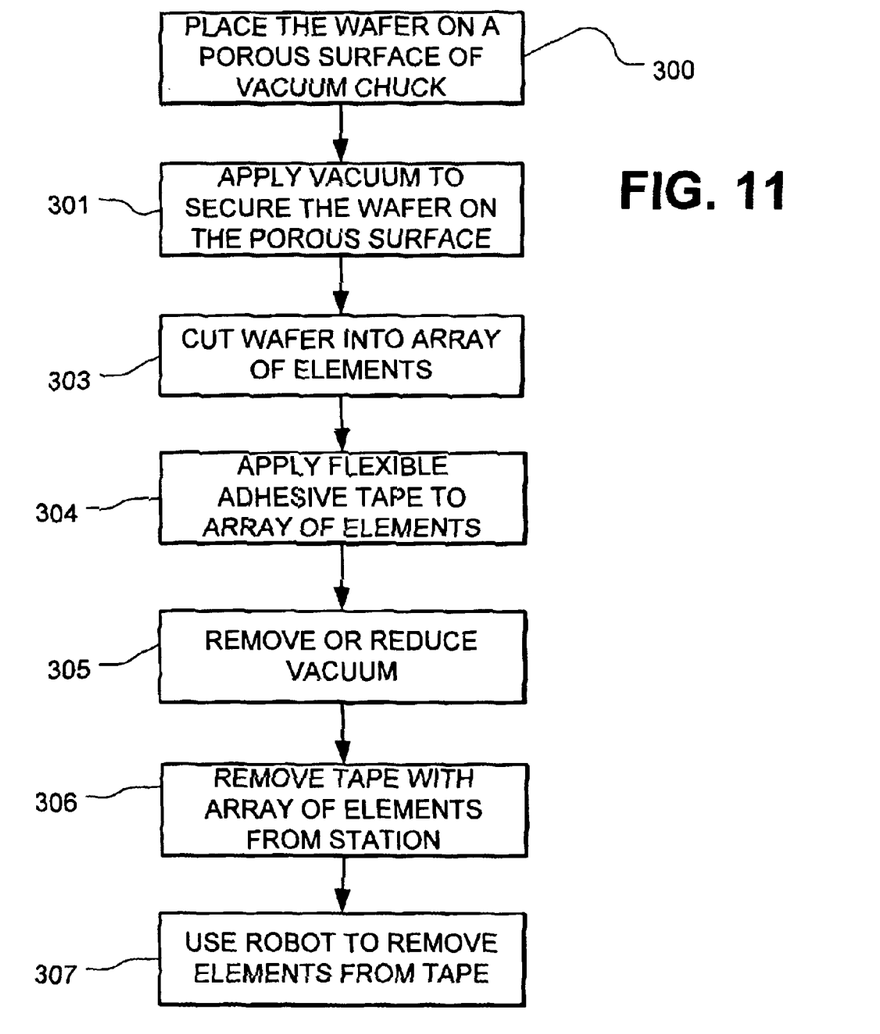
FIG. 11 is a basic flow chart of a manufacturing method according to the present invention.

The basic manufacturing process is shown in the flowchart of FIG. 11. As mentioned above, the present invention is particularly applicable to manufacturing of blue laser diodes based on gallium nitride. The gallium nitride is first grown on a sapphire substrate according to the technology known in the art. A layer of gallium nitride is removed from the sapphire substrate, and attached to a copper or aluminum substrate, or another relatively substrate as compared to sapphire, or to a semiconductor wafer or die having integrated circuits formed thereon for cooperative functioning with the laser diode. The resulting wafer including the composite of gallium nitride and a substrate, is placed on a porous surface of a vacuum chuck in a first step of the cutting process (block 300). In a next step, suction is applied to secure the wafer on the porous surface (block 301). The wafer is cut into an array of elements, using a laser or other cutting technique (block 302). A flexible adhesive tape is applied to the array of elements (block 303). The tape is removed with the array of elements adhering thereto, from the workstation (block 304). A robot is then used to remove the elements from the tape (block 305). In alternative embodiments, the elements are removed from the porous surface using a robot, or otherwise, without adhesive tape.

Figure 12A:
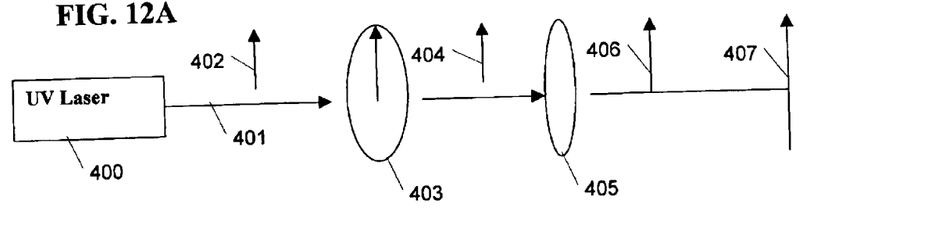
FIGS. 12A–12C show a relationship between polarization of laser pulses and scribe line scribing direction for uniform V-shaped grooves.

FIG. 12A illustrates an UV laser 400 which generates a linearly polarized output beam on line 401 aligned vertically, for example in the plane of the paper, as indicated by arrow 402. The polarization may be established intra-cavity as shown in FIG. 3. Alternative systems may include a polarizer outside the cavity. The pulses proceed to half wave plate 403, which is aligned vertically in a Y-direction, parallel with the polarization 402. After half wave plate 403, the pulses remain aligned vertically as indicated by arrow 404. The pulses proceed through focus lens 405 maintaining vertical polarization as indicated by arrow 406. The polarization is aligned with the machining direction of a scribe line 407 parallel with a Y-axis.

Figure 12B:
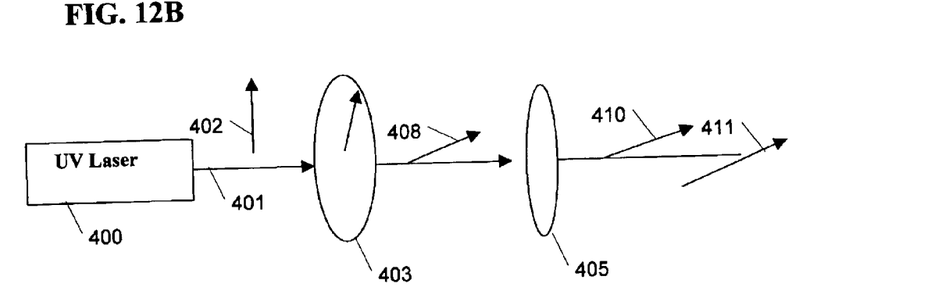

FIG. 12B illustrates the layout of FIG. 12A, with like components having the same reference numbers. In FIG. 12B, half wave plate 403 is rotated 45 degrees relative to the position of FIG. 12A. The rotation of the half wave plate 403 causes the polarization of the pulses to rotate 90 degrees as indicated by arrow 408, extending for this example into the paper. The pulses proceed through focus lens 405 maintaining their polarization as indicated by arrow 410. The polarization 410 is aligned with the machining direction of a scribe line 411 parallel with a X-axis.

Figure 12C:
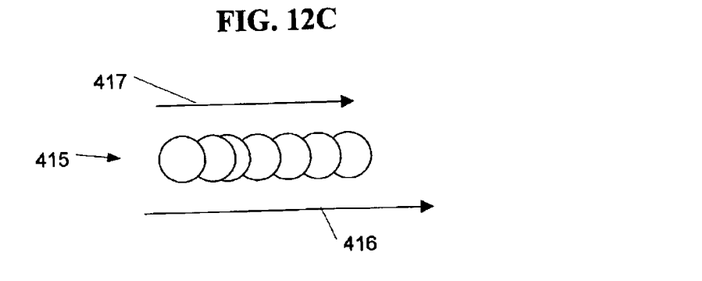

FIG. 12C illustrates laser polarization direction relative to the cutting or machining direction of the scribe line. Thus, a scribe line 415 consists of the sequence of overlapping pulses aligned in a cutting direction 416. The laser polarization direction 417 in the preferred system is parallel with the cutting direction 416. The alignment of polarization parallel with the cutting direction is found to produce uniform V-shaped grooves. The V-shaped grooves allow for more uniform separation of the die than can be achieved with grooves that are more U-shaped, or that are less uniform.

The present invention provides a process for manufacturing laser diode die, and other integrated device die, formed on substrates. Procedures according to embodiments of the invention include the following:

1) laying out and forming laser diodes in an array on an active surface of a sapphire substrate, with individual laser diodes separated by streets having a width less than 40 microns, and preferably around 25 microns or less;
2) removing the sapphire substrate of the wafer from the active surface having the array of laser diodes;
3) attaching an electrically substrate on the wafer, on the underside of the active surface having the array of laser diodes;
4) placing the wafer having a substrate with the active surface facing down on the porous mounting surface of the X-Y stage;
5) moving the wafer to a home position by controlling the stage
6) automatically, or semi-automatically, aligning the wafer position to coordinates established by the computer setup;
7) setting up a cutting pattern based on wafer and die size and layout parameters;
8) automatically, or semi-automatically, setting up the lighting levels for edge detection;
9) setting up stage speed, laser polarization and laser power for the required cutting depth;
8) turning on the debris removing system;
9) starting the process of laser cutting based on the cutting pattern on one line parallel to one axis;
10) continuing the process on other lines and axes, while controlling polarization, until cutting of the wafer is finished;
11) causing the stage to return to an exit position;
12) attaching a wafer tape on a metal frame to the cut wafer, turn off the vacuum, and removing the cut wafer from the chuck;
13) cleaning wafer with high-speed air or other gas jet to remove laser machining induced debris;
14) stretch the wafer tape for separation of the die, for their transport to other mounting apparatus using a pick and place system.

The procedures outlined above are carried out using the systems described above, or similar systems.

Accordingly, the present invention provides a significantly improved wafer cutting process and system for use with substrates. The process and system are low-cost, high yield, and high throughput compared to prior art substrate cutting technologies.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A system for separating integrated devices from an array of integrated devices on a semiconductor substrate, comprising:
    a laser generating laser energy in a wavelength substantially absorbed by the semiconductor substrate;
    a stage adapted to support, and move, the substrate, the stage including a vacuum chuck having a porous mounting surface adapted to secure the semiconductor substrate on the stage by suction through pores in the porous mounting surface;
    optics directing the laser energy to impact the semiconductor substrate secured on the stage; and
    a control system coupled to the solid state laser and the stage, the control system controlling the laser and stage, and causing the laser energy to impact the semiconductor substrate in a pattern at a rate of motion sufficient to cut kerfs substantially through the substrate in the pattern.

2. The system of claim 1, wherein the vacuum chuck comprises a removable porous member.

3. The system of claim 1, wherein the vacuum chuck comprises a porous member, and the porous member comprises ceramic.

4. The system of claim 1, wherein the vacuum chuck comprises a porous member, and the porous member comprises a flexible, porous sheet.

5. The system of claim 1, wherein the vacuum chuck comprises a porous member, and the porous member comprises porous paper.

6. The system of claim 1, wherein the vacuum chuck comprises a porous member, and the porous member comprises porous plastic.

7. The system of claim 1, wherein the vacuum chuck comprises a porous member, and the porous member comprises porous metal.

8. The system of claim 1, wherein the laser comprises a pulsed laser, and the control system controls a rate of motion of the stage, causing overlap of successive pulses.

9. The system of claim 1, including an edge detection system which detects edges of a substrate mounting on the stage during movement of the stage.

10. The system of claim 1, wherein the control system includes logic to set up said pattern.

11. The system of claim 1, including a video system for viewing a substrate mounted on the stage.

12. The system of claim 1, wherein the control system includes logic to set up parameters including pulse repetition rate, pulse energy and stage speed.

13. The system of claim 1, wherein the laser comprises a Q-switched Nd:YAG laser.

14. The system of claim 1, wherein the laser comprises a Q-switched Nd:YVO4 laser.

15. The system of claim 1, wherein the laser comprises a diode pumped, Q-switched Nd:YVO4 laser operating at a third harmonic wavelength of about 355 nanometers.

16. The system of claim 1, wherein the laser comprises a diode pumped, Q-switched Nd:YAG laser operating at a third harmonic wavelength of about 355 nanometers.

17. The system of claim 1, wherein the kerfs have a width between about 5 and 15 microns.

18. A system for separating laser diodes from an array of laser diodes on a semiconductor substrate, comprising:
    a Q-switched, solid state laser generating pulses of laser energy in a wavelength between about 150 and 560 nanometers, and a spot size of less than 25 microns, at a repetition rate of greater than 10 kHz;
    a stage adapted to support, and move, the semiconductor substrate, the stage including a vacuum chuck having a porous mounting surface adapted to secure the substrate on the stage by suction through pores in the porous mounting surface;
    optics directing the pulses to impact the semiconductor substrate secured on the stage; and
    a control system coupled to the solid state laser and the stage, the control system controlling the laser and stage, and causing the pulses to impact the semiconductor substrate in a pattern at a rate of motion causing overlap of successive pulses sufficient to cut kerfs substantially through the substrate.

19. The system of claim 18, wherein the vacuum chuck comprises a removable porous member.

20. The system of claim 18, wherein the vacuum chuck comprises a porous member, and the porous member comprises ceramic.

21. The system of claim 18, wherein the vacuum chuck comprises a porous member, and the porous member comprises a flexible, porous sheet.

22. The system of claim 18, wherein the vacuum chuck comprises a porous member, and the porous member comprises porous paper.

23. The system of claim 18, wherein the vacuum chuck comprises a porous member, and the porous member comprises porous plastic.

24. The system of claim 18, wherein the vacuum chuck comprises a porous member, and the porous member comprises porous metal.

25. The system of claim 18, wherein the control system includes logic to set up said pattern.

26. The system of claim 18, including a video system for viewing a substrate mounted on the stage.

27. The system of claim 18, wherein the laser comprises a Q-switched Nd:YAG laser.

28. The system of claim 18, wherein the laser comprises a Q-switched Nd:YVO4 laser.

29. The system of claim 18, wherein the laser comprises a diode pumped, Q-switched Nd:YAG laser operating at a third harmonic wavelength of about 355 nanometers.

30. The system of claim 18, wherein the laser comprises a diode pumped, Q-switched Nd:YVO4 laser operating at a third harmonic wavelength of about 355 nanometers.

31. The system of claim 18, wherein the kerfs have a width between about 5 and 15 microns.

32. The system of claim 18, wherein the overlap is in a range from 50 to 99 percent.

33. The system of claim 18, wherein the pulse rate is between about 20 kHz and 50 kHz.

34. The system of claim 18, wherein said energy density is between about 10 and 100 joules per square centimeter, said pulse duration is between about 10 and 30 nanoseconds, and the spot size is between about 5 and 25 microns.

35. The system of claim 18, wherein the substrate includes an integrated circuit.

* * * * *